Patented Sept. 17, 1929

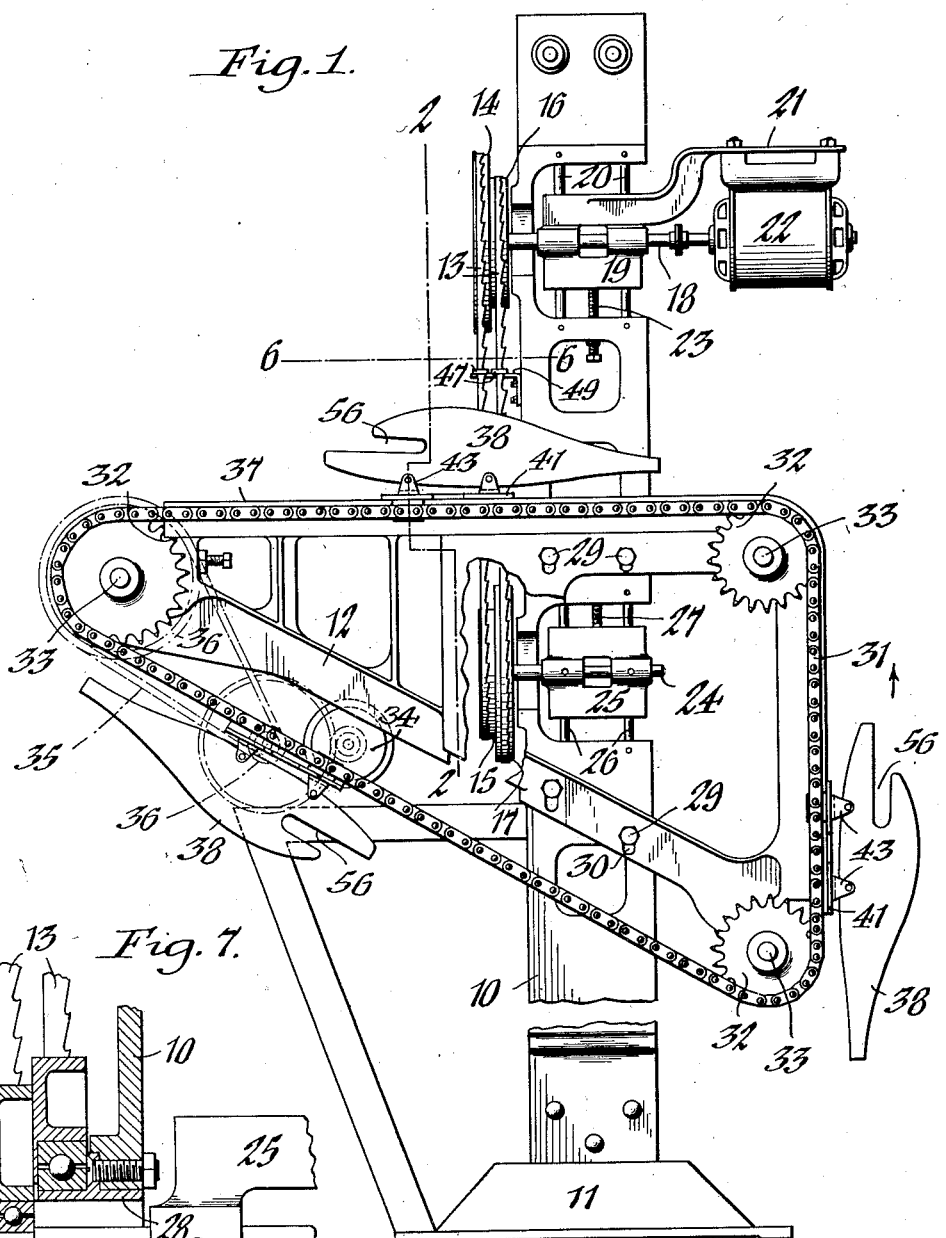

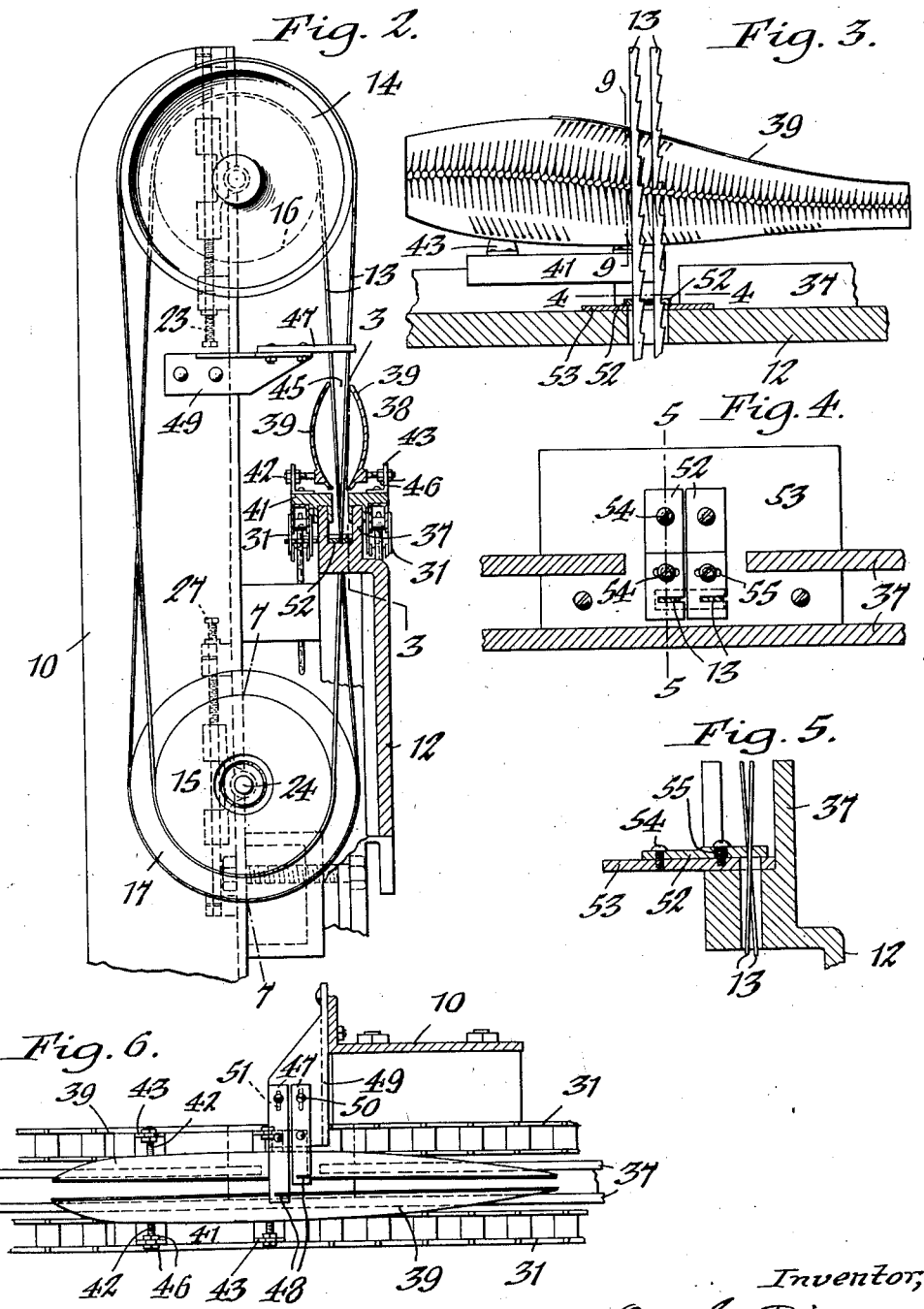

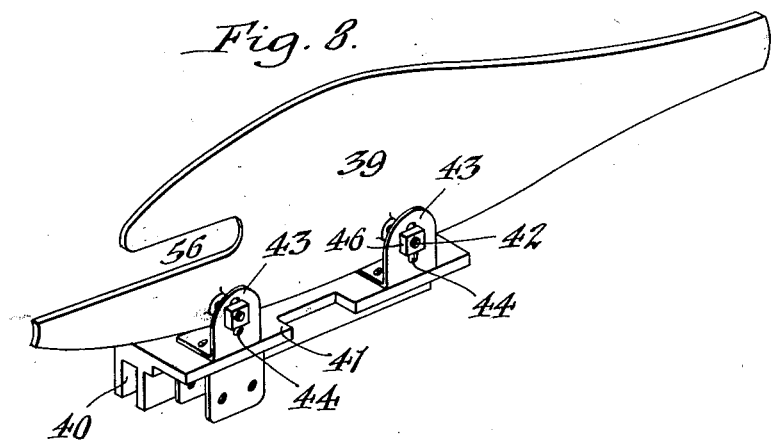
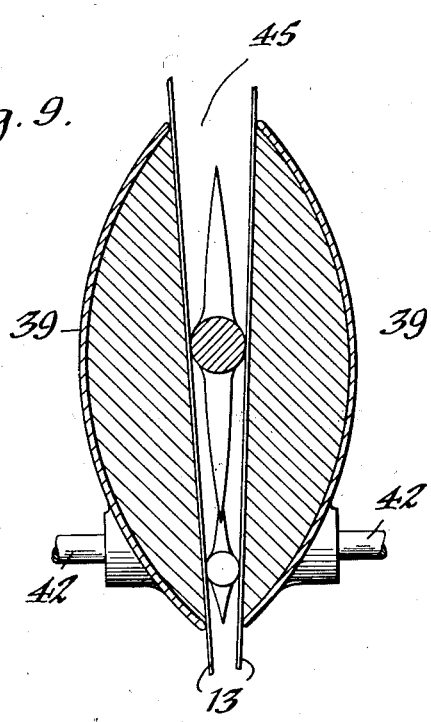

1,728,254

UNITED STATES PATENT OFFICE

OTTO G. RIESKE, OF BUFFALO, NEW YORK

FILLETING MACHINE

Application filed October 3, 1928. Serial No. 310,105.

This invention relates to a filleting machine which has been designed more particularly for slicing fish and removing the center bones therefrom.

One of its objects is the provision of a machine of this character whose parts are so constructed and arranged as to expeditiously and economically effect the cutting of the fish on either side of the center bone, backbone and belly with a minimum of waste.

Another object of the invention is to provide a filleting machine whose parts are designed to automatically adjust the cut relative to the bone as the fish are conveyed through the machine past the cutter mechanism.

A further object is the provision of simple means for readily adjusting the cutting mechanism to conveniently render the machine adaptable for operating on fish of different sizes.

Other objects and features of the invention reside in the construction and arrangement of parts hereinafter described and particularly pointed out in the appended claims.

In the accompanying drawings:—

Figure 1 is a front view, partly in section, of my improved filleting machine. Figure 2 is an enlarged transverse section on line 2—2, Figure 1. Figure 3 is a vertical longitudinal section on line 3—3, Figure 2. Figure 4 is an enlarged horizontal section on line 4—4, Figure 3. Figure 5 is a transverse section on line 5—5, Figure 4. Figure 6 is an enlarged horizontal section on line 6—6, Figure 1. Figure 7 is an enlarged vertical section taken on line 7—7, Figure 2. Figure 8 is a perspective of one of the holder-sections and its associated parts. Figure 9 is an enlarged transverse section on line 9—9, Figure 3.

In its general organization, this machine comprises a suitable frame for supporting its working parts, a cutting mechanism for producing a substantially wedge-shaped cut lengthwise through the fish on either side of its center bone, backbone and belly bone, and a conveyor having holders for carrying the fish past the cutting mechanism.

The frame of the machine may consist of two units or sections, one section consisting of an upright or standard 10 rising from a base 11, for supporting the cutting mechanism, and the other consisting of a substantially triangular shaped frame 12 mounted on the standard for supporting the conveyor mechanism of the machine.

Arranged side by side in a substantially upright position substantially centrally of the machine are a pair of cutter blades 13 which are preferably in the form of endless bands made of steel or other flexible material. These cutter blades are so disposed as to cross each other edgewise to form a wedge-shaped or angular cutting throat between them, the fish being presented to this cutting throat to slice the same on either side and close to the center bone, backbone and belly bone. One of the cutter blades 13 passes at its upper end around a comparatively large pulley 14 and at its lower end around a smaller pulley 15, while the companion cutter blade passes around a small upper pulley 16 and around a comparatively large lower pulley 17, whereby the crossing of the blades is produced between the upper and lower pairs of pulleys. The upper pulleys 14 and 16 are mounted on a horizontal shaft 18 journaled in a vertically adjustable bearing-bracket 19 guided on upright posts 20 disposed at the upper end of the standard 10. The bearing-bracket may be provided with an extension 21 for supporting an electric motor 22 which serves to drive the shaft 18 and propel the cutter blades 13 at a uniform high speed. The adjustment of the bearing-bracket to set the cutter blades at their required tautness may be effected by a vertical adjusting screw 23 mounted on the standard 10 below said bracket and abutting at its free end against the underside of the latter, as shown in Figure 1. The small lower pulley 15 is preferably mounted on a horizontal shaft 24 journaled in a bearing-bracket 25 guided on upright posts 26 and adjustable vertically through the medium of an adjusting screw 27. The companion lower pulley 17 may be journaled on a sleeve 28 bolted to the standard 10 and encircling or surrounding the adjacent portion to the shaft 24, the bore of the sleeve being of a size to permit a limited adjustment of the lower shaft relative thereto.

The triangular frame 12 is fastened to the standard 10 by bolts 29 and to enable this frame to have a limited vertical adjustment on the standard it has slots 30 therein through which the bolts pass. The conveyor mechanism which is supported by this frame preferably consists of two endless chains 31 disposed parallel to each other on opposite sides of the frame and passing around the sprocket wheels 32 mounted on corresponding shafts 33 located at the corners of the frame. Both conveyor chains are driven in unison at a slow speed compared with that of the cutter blades and for this purpose an electric motor 34 is provided which is connected by a chain and sprockets 35, 36 with the left hand sprocket shaft 33. These conveyor chains are driven in counter-clockwise direction toward the cutting edges of the blades 13, the upper stretch of the chain being substantially horizontal or at right angles to the path of travel of the blades, and disposed above the point of intersection of the blades, and the side stretches of these chains being vertical or at substantially right angles to the horizontal stretches.

Preferably formed integrally with the triangular frame 12 and disposed between the vertical and horizontal stretches of the conveyor chains 31 is a guide track 37, which is substantially U-shaped in cross section. Carried by these chains and guided on this track for properly presenting the fish centrally between the V-shaped throat formed by the intersecting cutter blades 13 are a plurality of fish holders or carriers 38 spaced at suitable intervals around the chains, four of them being shown, by way of example, in the drawings. Each of these fish holders is preferably composed of two sections or walls 39, each section being shaped substantially to the contour of the fish and being independently mounted on one of the conveyor chains 31. Each holder-section is of concavo-convex shape in cross section, the sections being disposed directly opposite each other on the respective chains with their concave faces disposed opposite each other to form a hollow chamber open at both ends for receiving the fish. Coupled to each of the conveyor chains and having a longitudinal groove or channel 40 in its underside for engagement with one of the legs of the U-shaped guide track 37, is a base plate 41 to which the respective holder-section 39 is detachably connected. As shown in the drawings, the holder-sections have laterally projecting stud-bolts 42 which engage laterally yieldable brackets 43 raising from the top sides of the corresponding base plates 41. For the purpose of adjusting the holder-sections on their brackets the latter are provided with vertical slots 44 which readily permit the holder to be adjusted so as to present the fish in the correct relative position to the cutter blades. As shown in Figures 2, 6 and 9, the opposing upper and lower edges of the holder-sections terminate short of each other to provide a longitudinal passage 45 between them for receiving the cutter blades as the holder travels past the same to slice the fish. The holder-sections are adjustable toward and from each other to vary the width of the passage 45 in accordance with the particular size and shape of the fish being operated upon, and to this end clamping nuts 46 are applied to the stud-bolts 42 on either side of the yieldable brackets 43. By adjusting these nuts accordingly, the holder-sections may conveniently set in any position desired. In practice the holders are slightly inclined to the horizontal as they are presented to the cutter blades 13, as seen in Figures 1 and 3, the head end of the fish being first to engage the cutter blades with its center bone positioned between the upper wider portion of the V-shaped throat, and as the fish is propelled forwardly, the center bone, which gradually tapers toward the tail end of the fish, is correspondingly lowered, due to the inclined position of the holder, to bring such bone opposite the contracted lower portion of the V-shaped throat, whereby the width of the cut lengthwise through the fish is gradually lessened from the head end to the tail end of the fish.

Means are provided for adjusting the operative portions of the cutter blades 13 to predetermine their correct position for governing the cut to the particular size and type of fish being operated upon. To this end, guides are provided above and below the intersecting portions of the cutter blades, the upper guide consisting of blocks 47 having slots 48 near their front ends for receiving the companion cutter blades edgewise. Each guide block 47 is adjustably mounted on a suitable bracket 49 secured to the standard 10, the adjustment being effected by one or more clamping screws 50 applied to the bracket and engaging a slot 51 therein. Upon loosening the clamping screw the guide block may be moved in or out or swung about the screw as a pivot to bring the cutting blade at the proper angle required for cutting the fish on either side of the center bone. The lower guide blocks 52 are similarly adjustable and applied to a base plate 53 suitably secured to that portion of the guide track 37 adjacent the cutter blades, these blocks being fastened to the base plate by clamping screws 54 engaging slots 55 therein, whereby such blocks can be adjusted to bring the blades at any desired cutting angle.

Briefly stated the operation of the machine is as follows:—

Upon starting the electric motors 22 and 34, motion is transmitted to the cutter blades 13 and to the conveyor chains 31, the cutter blades revolving at a high speed and the conveyor chain at a comparatively slow speed. As the holders 38 are swung or presented by the conveyor chain into a vertical position, as seen at the right in Figure 1, the operator drops the fish, tail first, into these holders, and as they are propelled horizontally by the conveyor chains the fish contained in them is presented to the cutting blades and a close, wedge-shaped cut is made on either side of the center bone of the fish, the blades being set to cut as close to the bone as possible to reduce the waste to a minimum. After the cutting operation has been performed, the holders are carried to the left hand end of the machine, where the fish are allowed to drop by gravity from the holders into a receptacle provided for receiving them. It will be noted that the arrangement of the holders and the cutter blades is such that they automatically adjust the cut as the fish passes between the blades.

It will be understood that my invention is not limited to the exact details of construction herein shown and described, as various changes therein and modifications thereof may be made within the scope of the appended claims without departing from the spirit of the invention or sacrificing any of its advantages.

The heads of the fish holders 38 are provided with recesses 56 through which the nape bones of the fish are adapted to project.

I claim as my invention:—

1. A machine of the character described, comprising a frame, and a pair of cutter blades arranged side by side in said frame and crossing each other edgewise thereof to form an angular cutting throat between them for receiving the article to be cut.

2. A machine of the character described, comprising a frame, a pair of cutter blades arranged side by side in said frame and crossing each other edgewise thereof to form an angular cutting throat between them, and a carrier movable past said blades for presenting the article to be cut thereto.

3. A machine of the character described, comprising a frame, a pair of movable cutter blades arranged side by side in said frame and crossing each other edgewise thereof to form an angular cutting throat between them, and a carrier movable at approximately right angles to the path of movement of the blades for presenting the article to be cut substantially centrally between said blades.

4. A filleting machine, comprising a pair of cutter blades arranged side by side and crossing each other edgewise thereof to form an angular cutting throat between them, and means for presenting a fish between said cutters to sever the same on either side of its center-bone.

5. A filleting machine, comprising a pair of cutter blades arranged side by side and crossing each other edgewise thereof to form an angular cutting throat between them, and means for presenting a fish between said cutters to sever the same on either side of its center-bone, said means being constructed and arranged to present the fish lengthwise between the cutting throat formed by the blades and to gradually bring the fish nearer the crossed ends of the blades as it passes between them from its head-end to its tail-end.

6. A filleting machine, comprising a movable carrier for the fish, and cutter blades disposed in the path of movement of the carrier for producing a substantially wedge-shaped cut on either side of the center-bone of the fish.

7. A filleting machine, comprising a horizontally movable carrier for the fish, and cutter blades disposed substantially vertically across the path of movement of the carrier for producing a wedge-shaped cut on either side of the center-bone of the fish, said carrier being slightly inclined to the horizontal to gradually present the center-bone of the fish at successively lower points between the blades as it passes between the latter, whereby the width of the cut is gradually lessened from the head-end to the tail-end of the fish.

8. A filleting machine, comprising a pair of cutter blades arranged side by side and crossing each other edgewise thereof to form an angular cutting throat between them, and a centrally-divided carrier for the fish movable past said blades for severing the fish on either side of its center-bone, the blades being free to enter the central space between the carrier as the latter moves past the same.

9. A filleting machine, comprising a pair of vertically-disposed cutter blades arranged side by side and crossing each other edgewise thereof to form an angular throat between them, a conveyor movable horizontally relatively to said cutter blades and disposed above the intersecting point thereof, and open-ended, longitudinally-divided carriers for the fish mounted on said conveyor for presenting the fish to said blades to sever the same on either side of its center-bone.

10. A filleting machine, comprising a frame, a horizontally-movable conveyor mounted thereon, a pair of vertically movable cutter blades arranged side by side adjacent to said conveyor and crossing each other edgewise thereof below the conveyor to form an annular cutting throat between them disposed over the conveyor, and a plurality of open-ended fish-carriers mounted on said conveyor for delivering the fish centrally between the cutters to sever the same into two fillets on either side of the center-bones, said carriers being slightly inclined to the horizontal to gradually present the center-bone of the fish at successively lower points between the blades and to correspondingly lessen the width of the cut from the head-end to the tail-end of the fish.

11. A filleting machine, comprising a frame, a pair of movable cutter blades arranged side by side in said frame and crossing each other edgewise thereof to form an angular cutting throat between them, guides for the blades disposed above and below the point of intersection thereof, and a carrier for the fish movable past said blades at a point above their intersection.

12. A filleting machine, comprising a frame, a pair of movable cutter blades arranged side by side in said frame and crossing each other edgewise thereof to form an angular cutting throat between them, a conveyor movable past the cutter blades, and holders for the fish mounted on said conveyor, each of said holders consisting of oppositely disposed sections shaped to receive a fish between them and having their opposing upper and lower edges spaced apart lengthwise of the holder to form a passage for receiving the cutter blades.

13. A filleting machine, comprising a conveyor consisting of a pair of endless belts arranged side by side, plates carried by said belts and arranged in pairs, a plurality of holders each consisting of two companion sections mounted on corresponding pairs of said plates and shaped to receive a fish between them, said sections being open at their front and rear ends and being spaced apart laterally to provide a longitudinal passage between them, and cutter blades disposed in the path of movement of the holders, said blades being adapted to enter said passage during the movement of the holder relative thereto.

14. A filleting machine, comprising a conveyor carrying holder-attaching plates, yieldable brackets applied to said plates, fish-holders supported on said brackets and adjustable relatively thereto, each of said holders consisting of two sections spaced apart laterally to provide a longitudinal passage between them, and cutter blades disposed in the path of movement of the conveyor and engageable with said holder passage for producing a substantially wedge-shaped cut on either side of the center bone of the fish.

15. A filleting machine, comprising a frame having a guide track thereon, a conveyor arranged alongside the track and having holder-attaching plates applied thereto and engaging said track, fish-holders mounted on said attaching plates, said holders being open at both ends and divided longitudinally to form a passage substantially centrally through the same, and cutter blades arranged side by side across the path of movement of the holders and intersecting each other edgewise to form an angular cutting throat between them, said blades being adapted to be received in the holder-passage as the holders move past the blades.

OTTO G. RIESKE.